United States Patent [19]
Kelly et al.

[11] Patent Number: 5,806,042
[45] Date of Patent: Sep. 8, 1998

[54] SYSTEM FOR DESIGNING AND IMPLEMENTING BANK OWNED LIFE INSURANCE (BOLI) WITH A REINSURANCE OPTION

[76] Inventors: William Franklin Kelly, 432 Lampwick Ct., Naperville, Ill. 60563; Charles D. Bennett, 3735 Crestview Cir., Brookfield, Wis. 53005; Warren T. Wamberg, 322 Oak Knoll Rd., Barrington Hills, Ill. 60010

[21] Appl. No.: 540,695

[22] Filed: Oct. 11, 1995

[51] Int. Cl.⁶ ................................................... G06F 17/60
[52] U.S. Cl. .................................................. 705/4; 705/35
[58] Field of Search ................................ 395/204, 207, 395/230, 235; 705/36, 4, 7, 30, 35

[56] References Cited

U.S. PATENT DOCUMENTS

| 4,750,121 | 6/1988 | Halley et al. | 395/235 |
| 5,499,359 | 3/1996 | Vijaykumar | 395/617 |

OTHER PUBLICATIONS

Christensen, Burke A., Reaffirming Bank's Right to Hold Life Insurance, Trusts & Estates, pp. 65–66, Oct. 1991.
Schiff, Albert J., BOLI: A Vehicle For Economic Stability, Life Association News, pp. 48–50, May 1992.
Wong, Everett D., Riddle Me This: The Truths and Myths of BOLI, Life Association News, pp. 96, 98–100,104; 106; 108; Oct. 1993.
The Wall Street Journal, col. 6, p. 37, May 15, 1980.
Downes, J., Goodman, J.E., Dictionary of Finance and Investment Terms, Fourth Edition, Barron's Educational Series, Inc., p. 473, 1995.
Black, Kenneth Jr., Insurable Interest: A Reappraisal, Best's Review, pp. 20, 22, 24, 119–120, Apr. 1988.

Primary Examiner—Edward R. Cosimano
Assistant Examiner—Barton L. Bainbridge
Attorney, Agent, or Firm—Dickstein Shapiro Morin & Oshinsky LLP

[57] ABSTRACT

The present invention involves a computer software and hardware system which smoothly integrates the following functions into an integrated computer-based system for designing and administering a BOLI plan for national banks under current federal and state guidelines and financial market constraints. The systems includes determining the highest BOLI premium permitted under OCC Banking Circular 9651, determining insurable interest requirements by accessing a database with the appropriate state's insurable interest guidelines, generating performance estimates for the BOLI plan and allocating premium amount by business unit and employee. The system also ensures that the BOLI plan is in compliance with the regulatory requirements for the business unit. In addition, the system reinsures the BOLI plan through a captive insurance company of the financial organization, obtaining policy values for the captive insurance company. Other aspects of the system include verifying, reconciling, consolidating and reporting policy values for the financial organization, and performing administrative procedures for the BOLI plan of the financial organization.

11 Claims, 8 Drawing Sheets

FIG. 7

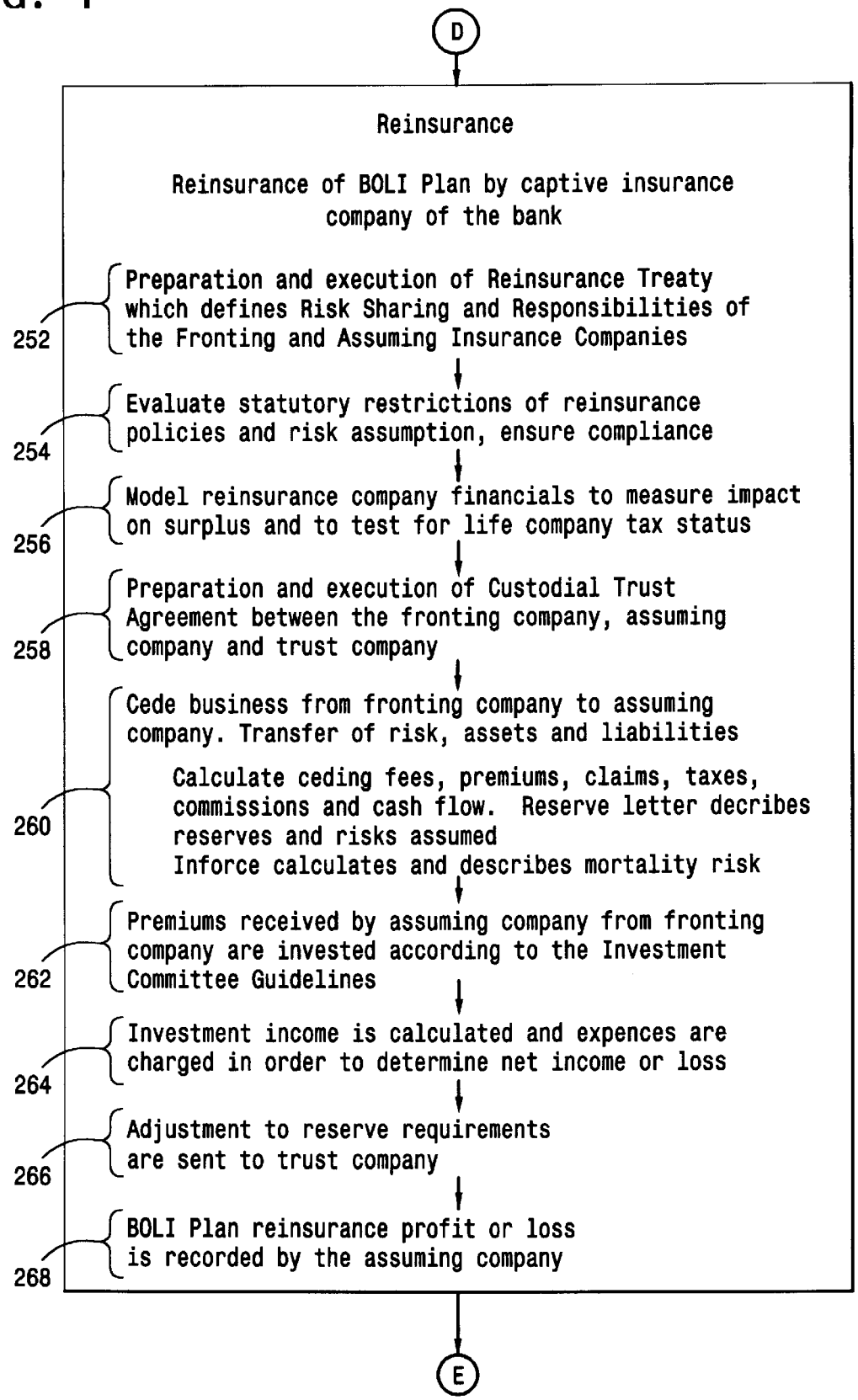

Reinsurance

Reinsurance of BOLI Plan by captive insurance company of the bank

252 — Preparation and execution of Reinsurance Treaty which defines Risk Sharing and Responsibilities of the Fronting and Assuming Insurance Companies 254 — Evaluate statutory restrictions of reinsurance policies and risk assumption, ensure compliance 256 — Model reinsurance company financials to measure impact on surplus and to test for life company tax status 258 — Preparation and execution of Custodial Trust Agreement between the fronting company, assuming company and trust company 260 — Cede business from fronting company to assuming company. Transfer of risk, assets and liabilities
 Calculate ceding fees, premiums, claims, taxes, commissions and cash flow. Reserve letter decribes reserves and risks assumed
 Inforce calculates and describes mortality risk 262 — Premiums received by assuming company from fronting company are invested according to the Investment Committee Guidelines 264 — Investment income is calculated and expences are charged in order to determine net income or loss 266 — Adjustment to reserve requirements are sent to trust company 268 — BOLI Plan reinsurance profit or loss is recorded by the assuming company

SYSTEM FOR DESIGNING AND IMPLEMENTING BANK OWNED LIFE INSURANCE (BOLI) WITH A REINSURANCE OPTION

FIELD OF THE INVENTION

The invention relates to Bank Owned Life Insurance (BOLI) and a system for designing and administering a BOLI plan for financial organizations (herein referred to as the BOLI system). The BOLI system provides a single comprehensive and integrated computer system and computer program incorporating all the necessary requirements for ensuring the BOLI plan meets the financial needs of the bank in accordance with substantive and complex legal regulatory guidelines. Examples of the type of functionality offered by the BOLI system includes the capability of determining premiums, deriving the insurable interest for a particular state, monitoring reinsurance, tracking and reporting on the performance of the reinsurance plan, and performing necessary administrative procedures.

BACKGROUND OF THE ART

Employee benefits, such as medical, group life, dental, disability and other ERISA welfare plan expenses, are a significant element in a financial organization's compensation programs. The expenses associated with these benefits comprise from 20 to 30 percent of all compensation expenses. This is a meaningful number for financial institutions, especially for a national bank. In general, total compensation is a national bank's second largest expense. In addition, recent studies have suggested that benefit plan expenses will continue to increase at a rate that is far in excess of the rate of increase of a bank's interest income.

Thus, the careful management of compensation expenses can have a pronounced impact on net income for a bank. The banks, however, are severely limited in the methods by which they can manage these compensation expenses, especially those methods which involve increasing revenue to offset rising employee benefit expenses.

One tool available for financing employee benefit expenses is Bank Owned Life Insurance ("BOLI"). BOLI plans or their equivalents can be implemented for a number of financial organizations which are subject to similar financial and legal constraints. The traditional market for a BOLI plan, however, are national banks.

Under a BOLI plan, a bank purchases insurance on a group of employees. The group can be all full time employees or a group of managers, e.g., Assistant Vice Presidents and above. The bank pays the premium(s) and owns the cash value of the polices. The bank is also the beneficiary of the insurance. The employees may or may not receive any of the insurance benefits directly depending upon the discretion of the financial organization. The coverage does not replace or interfere with any other insurance provided by the bank, e.g., group term life insurance and so forth.

The bank earns income from the policies from two sources. The first is from the growth of the cash value of the policy. The cash value is the monetary value of the policy if surrendered. It is also the value which is counted as an asset by the bank. The cash value increases each year as interest is added by the insurance company. The second source of income comes from the insurance proceeds paid to the bank when an employee dies. The payment of insurance proceeds and the earnings from the cash value are income tax-free (unless surrendered).

The reasons banks use BOLI to offset employee benefit costs are two-fold. First, BOLI earns a greater after-tax yield than many bank investments. Therefore, a favorable spread is created. This spread is greater than what a bank earns on other investments, e.g., Treasury Bills, corporate bonds, etc. Second, BOLI is a long-term investment which corresponds to the long-term nature of benefit plan expenses.

The policies the bank buys are investment-oriented and produce income for the bank in the first year they are purchased. The after-tax income they earn is higher than what the bank earns on many alternative investments. This explains the growing popularity of BOLI as demonstrated by the industry wide increase in BOLI investments from $500,000 in the 1980's to over an estimated $5,500,000,000 in 1995.

There are two guidelines which determine the amount of coverage a bank could purchase on employees. The first is governed by the State's Insurable Interest Guidelines which varies from state to state. The second is regulated through guidelines established by the Office of the Comptroller of the Currency (the "OCC"). The guidelines which are of particular importance to BOLI plans are found in OCC Banking Circular 9651 (the "Circular").

The OCC provides federal regulatory oversight for a national bank's purchase of life insurance policies. The Circular provides general guidelines for national banks to use in determining whether they may purchase a particular life insurance product. Under the Circular, a national bank may purchase life insurance only for a purpose incidental to the business of banking, and not as an investment.

A bank may also take an interest in life insurance policies as security for loans. The Circular confirms that life insurance death benefits and cash surrender values are unsecured assets of the bank. The cash surrender value of insurance should be reported as an "Other Asset" on the bank's financial statement.

BOLI appeals to the banking industry because it is marketed as a high-return, low-risk, long-term asset. The "high return" is premised in part on the fact that BOLI policies' earnings are not taxed either currently or when their death proceeds are paid, and in part on the expectation that the insurers issuing the policies offer and will continue to offer a greater yield on the policies than purchasing banks could obtain with other assets. Intermediary companies arrange the placement of BOLI coverage issued by unrelated life insurance companies that are typically AAA, AA+ or AA rated by Standard and Poors, in an effort to minimize risk for the purchasing banks. In placing BOLI coverage, the intermediary company performs actuarial calculations to determine the amount of life insurance that the bank may purchase in accordance with Banking Circular 9651, thus designing a plan to meet the particular bank's needs, and administering the plan.

The problems associated with constructing a BOLI plan to fulfill the needs of a particular financial organization are considerable. Specifically, there are problems associated with determining BOLI plan limits imposed by federal and state regulatory guidelines. In many cases, the numerous factors involved in determining these limits for even a medium size bank could lead to hundreds of thousands of different permutations. The sheer volume of variables make such a calculation nearly impossible to generate by hand, especially given the yearly review and reporting requirements of these regulatory guidelines.

Another problem associated with implementing the BOLI plan is the bank's need for complicated financial data such as Earnings Per Share, Return on Asset, Return on Equity, Net Income, and a host of other categories. The bank uses this information for accounting and strategic planning purposes.

Yet another problem is the size and sheer volume of administrative functions associated with the ongoing management of the BOLI plan. These administrative functions make the BOLI plan a difficult and cumbersome plan to implement in accordance with the numerous financial considerations and legal requirements.

Aside from the management and administrative problems associated with designing and implementing a BOLI plan, the traditional BOLI plan has inherent drawbacks which makes it unattractive to the banking industry. In particular, banks are not comfortable making a large premium payment to a carrier that would go into the general account or portfolio of the carrier. If the carrier has a credit difficulty or an impediment to making payments the bank becomes the general creditor of the carrier. Thus there is a problem with maintaining control over the banks' transferred assets. Further, given the long-term nature of the plan, banks were concerned with the long-term credit worthiness of the insurance carriers and the delay in cash flow (since it is predicated on the death of an employee). Another problem with traditional BOLI products is that banks can only lend 15% of shareholder equity to a single entity, and only 25% total of a bank's shareholder equity can be used for life insurance. Thus, if a favored carrier of the bank has existing insurance products, the premium amount the bank could pay to the carrier would be limited. Finally, the plan fails to provide an after-tax interest gain exceeding straightforward and vastly less complicated investments such as Treasury Bills.

The aforementioned problems, coupled with the significant administrative burden in executing the plan and the long-term nature of the plan, removes BOLI as an attractive investment opportunity for banks. This comes at a time when competition with non-bank entities is projected to lower the profit margins for most banks over the next few years, while costs associated with employee benefits are predicted to rise, thus forcing banks to rely more heavily on investments as a means of maintaining financial health. This makes the removal of BOLI as a profitable investment vehicle particularly onerous given the relatively few number of investment options left open to the banks due to federal and state regulations.

Beyond some simple spread sheet programs which are currently used to ensure compliance with the Circular, relatively little attention has been paid to computer hardware and computer software systems for handling the problems associated with the BOLI plan to minimize actuarial, management and accounting time and costs. Even more critically, no computer software and/or computer hardware system has been developed to correct the deficiencies inherent in traditional BOLI plans by providing a system capable of managing and controlling the reinsurance of the BOLI plans.

In fact, prior systems are solely directed towards monitoring current BOLI plans to ensure governmental compliance. Those systems have thus not integrated all phases of a BOLI plan, especially those involving a reinsurance option. In sum, there does not appear to be a computer software, hardware system available for designing, implementing and monitoring BOLI plan parameters in an efficient integrated system.

SUMMARY OF THE INVENTION

It is thus apparent from the above that there exists a significant need in the art for a system which enables a company to effectively and efficiently design and administer a BOLI plan to offset employee benefit expenses while providing the company with the analytical and management capabilities for controlling a BOLI plan with a reinsurance option.

It is therefore one of the objectives of this invention to provide a system for designing and implementing a BOLI plan for national banks in conformance with legal regulatory requirements.

Another object of this invention is to provide a system for implementing a BOLI plan for banks with reinsurance of the BOLI plan by a captive insurance company of the bank in conformance with legal regulatory requirements.

Another object of this invention is to provide a system for effectively and efficiently generating the highest amount of BOLI premiums a bank may purchase within the guidelines set forth in the Circular.

Another object of this invention is to provide a system for calculating the insurable interest for a given State's insurable interest requirements.

Another object of this invention is to provide a system which automatically produces complicated financial data by category with respect to the BOLI plan such as Earnings Per Share, Return on Asset, Return on Equity, Net Income, Net Interest Margin, Capital Ratios and a host of others.

Yet another object of this invention is to provide a system for evaluating statutory restrictions of reinsurance policies and risk assumption, and ensure compliance with applicable legal regulations.

It is a further object of this invention to provide a system for modeling reinsurance company financials to measure impact on surplus and to test for life company tax status.

It is yet another object of this invention to provide a system for ceding business from an insurance company to a reinsurance company which includes the transfer of risk, assets and liabilities, as well as calculating ceding fees, cash flow and in force calculations and mortality risks.

Another object of this invention is to provide a system for calculating investment income and expenses charged in order to determine net income or loss.

It is still another object of this invention to provide a system for adjusting reserve requirements to send to the trust company.

Another object of this invention is to provide a system for recording by the reinsurance company BOLI plan reinsurance profit or loss.

It is a further object of this invention to provide a system for a computer support system which verifies, reconciles, consolidates and reports policy values for the client bank, including summary detail of all accounting entries, premium values report, beneficiary report, current and projected cash surrender value report, census reconciliation report, comprehensive listing of policy information report, cash flow report, net policy face value report, profit/loss report, and plan liquidity report.

Another object of this invention is to provide a system for performing administrative procedures such as the periodic sweep of social security records to identity and initiate death claims for covered employees who have terminated or retired, periodic employee status updates to identity terminated or retired employees covered in the plan, and alternative policy settlement options.

Briefly described, these and other objectives of the invention are accomplished by providing a system which smoothly integrates the following functions into an integrated computer-based system for designing and administering a BOLI plan for national banks under current federal and state guidelines and financial market constraints, including such means as for determining the highest BOLI premium permitted under OCC Banking Circular 9651. The system determines insurable interest requirements by accessing a database with the appropriate state's insurable interest guidelines, generating performance estimates for the BOLI plan, allocating premium amount by business unit and employee and ensuring that the BOLI plan is in compliance with the regulatory requirements for the business unit. The systems also reinsures the BOLI plan through a captive insurance company of the financial organization. Other functions performed by the system include obtaining policy values for the captive insurance company, verifying, reconciling, consolidating and reporting policy values for the financial organization, and performing administrative procedures for the BOLI plan of the financial organization.

With these and other objectives, advantages and features of the invention that may become apparent, the nature of the invention may be more clearly understood by reference to the following detailed description of the invention, the appended claims, and to the several drawings attached herein.

BRIEF DESCRIPTION OF THE DRAWINGS

FIG. 7 is a block flow diagram of the analytical system for reinsuring the BOLI plan.

DETAILED DESCRIPTION OF THE PREFERRED EMBODIMENT

Figure 1:
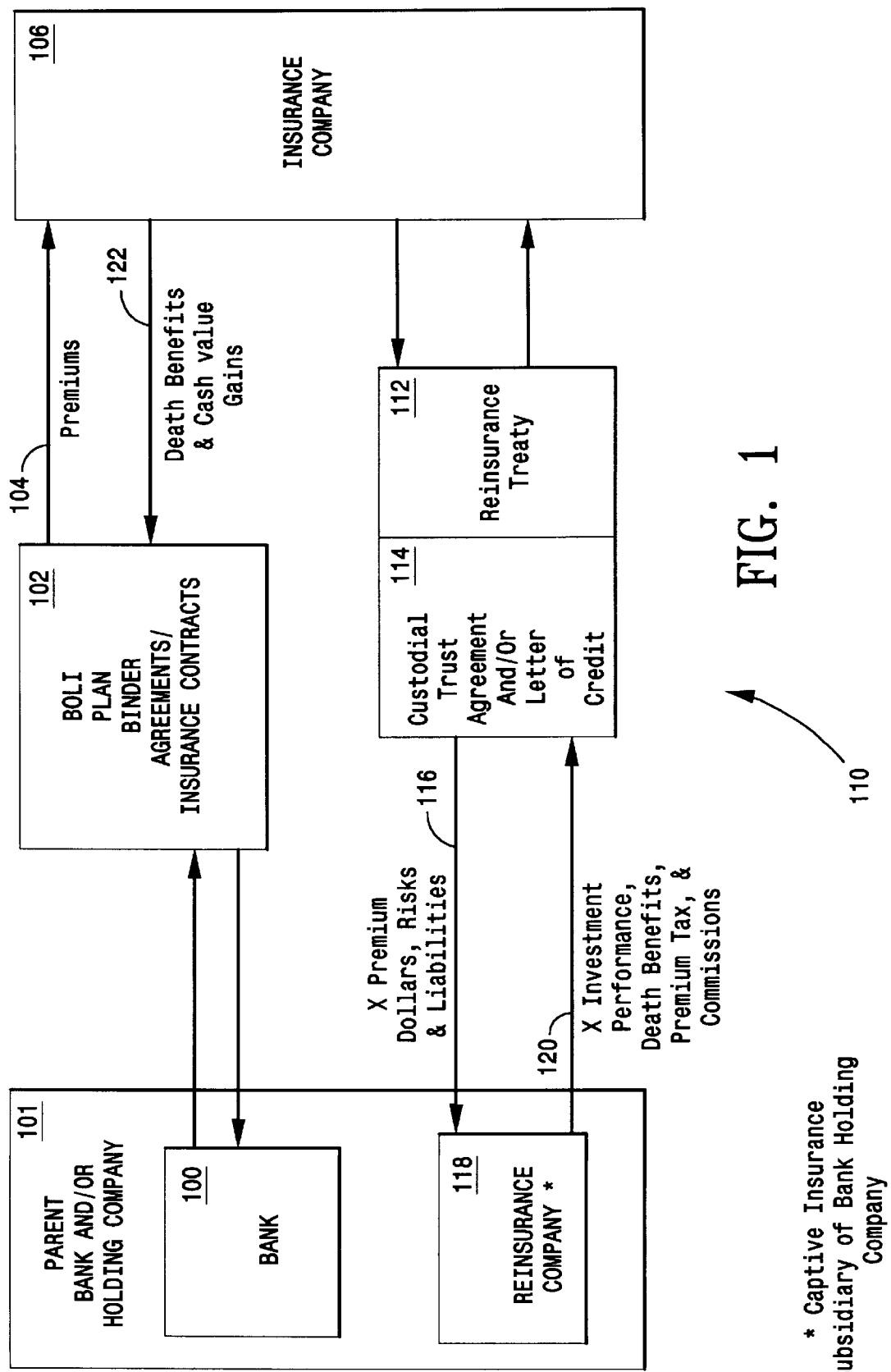
FIG. 1 is a block flow diagram showing the life insurance organization according to a preferred embodiment of the present invention.

Referring now in detail to the drawings wherein like parts are designated by like reference numerals throughout, there is illustrated in FIG. 1 a block-flow diagram of the BOLI plan life insurance organization 110 according to a preferred embodiment of the present invention. The financial institution which will be used in the preferred embodiment is a national bank.

One of the purposes of the life insurance organization 110 is to implement a BOLI plan as an asset which mitigates balance sheet recognition of the indirect cost portion of employee benefits liability, while also generating earnings sufficient to cover the cost of the employee benefits. The life insurance organization, as implemented in FIG. 1, also provides an ongoing administrative computer-based system to enable corporations to manage the BOLI plan efficiently and in full compliance with federal and state regulatory guidelines.

Under a BOLI plan, a purchasing bank 100 of a parent bank and/or Holding Company 101 sells Treasury Bills or other assets to provide cash to purchase individual, single premium life insurance policies covering the lives of a group of its employees. The bank 100 enters into a BOLI plan binder agreement and/or insurance contracts 102 which sets forth the details of the insurance policy between the bank and the insurance company 106. The bank 100 pays the premiums 104 to the insurance company 106 and owns the cash value and death benefits 122 of the policies. The bank is the beneficiary of the insurance and holds the policies' values as its general assets. The employees may or may not receive any of the insurance benefits directly depending upon the discretion of the financial organization. The coverage does not replace or interfere with any other insurance provided by the bank, e.g., group term life insurance and so forth. The earnings from the cash surrender values and death benefits from the policies are expected to offset a substantial portion of the bank's expenditures under its employee benefit plans.

The insurance company 106 in turn reinsures the BOLI plan of the bank 100 with a reinsurance company 118 which is a captive insurance subsidiary of the parent bank or holding company 101. The reinsurance can be implemented using a number of different systems such as assumptive reinsurance or mortality reinsurance. In the preferred embodiment, the quota shared method of reinsurance is used. This method passes a certain percentage of the premium dollars, risk and liabilities 116 to the reinsurance company 118 in exchange for the assumption of the equivalent percentage of investment performance, death benefits, premium tax and commissions 120 associated with the BOLI plan. The relationship between the insurance company 106 and reinsurance company 118 is defined by the reinsurance treaty 112. The surplus drain and required reserves of the transaction is held in a trust company controlled by the custodial trust agreement and/or letter of credit 114.

Figure 2:
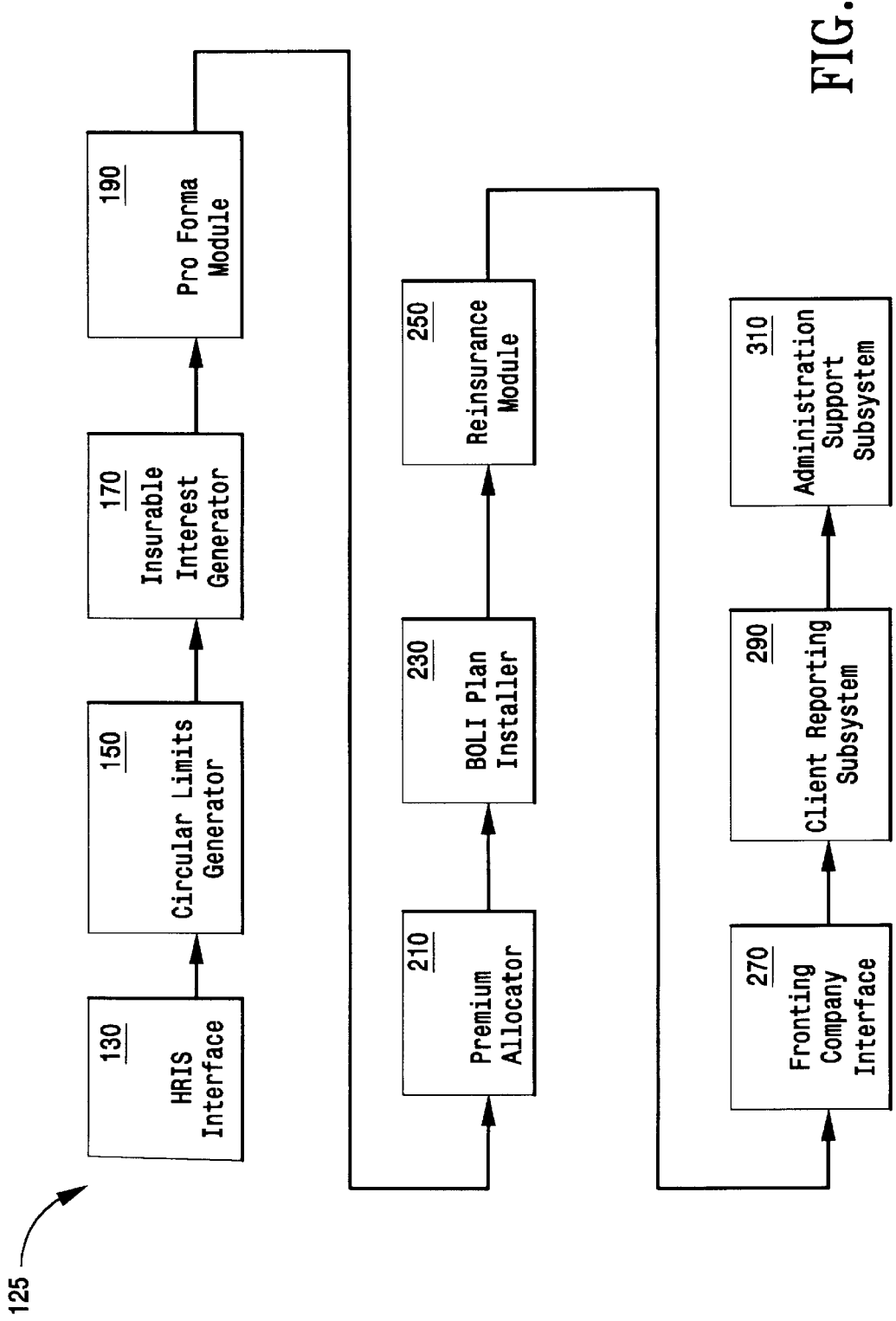
FIG. 2 is a block flow diagram of the analytical system for determining parameters for the life insurance organization according to FIG. 1.

Referring now to FIG. 2, flow chart 125 illustrates the front-end analytical system used by a computer system for implementing the BOLI plan. The computer system operates the BOLI system programs shown in FIG. 1. The analytical system consists of computer hardware and software. The computer hardware comprises a personal microcomputer that has the capacity for rapidly developing value estimates based on the software. Although many types of computers may be used, the present invention contemplates a computer system using at least an 80-386 based microprocessor and at least a 40 MB hard drive capacity and at least 1 MB of RAM.

FIG. 2 also shows a HRIS computer interface 130 which interfaces with the Human Resources Information System (the "HRIS") to pull data on the employees which is used to calculate the eligible employee benefit plan expenses and contributions. This information is passed to the Circular limits generator 150 which determines BOLI plan limits in conformance with the Circular. Once the federal plan limits are established, the insurable interest generator 170 calculates the insurable interest limit (i.e., amount of death benefits) allowed for each employee as per the guidelines for the State where the BOLI transaction has legal residence.

Once the system establishes these limits, the pro forma module 190 generates performance estimates for the BOLI plan. The premium allocatur 210 then calculates the regulatory requirements for each business unit involved in the life insurance organization 110 by employee and ensures that the BOLI plan is in compliance with such requirements. Once the BOLI plan has been fully designed for the bank 100, the BOLI plan installer 230 initiates the process for implementing the BOLI plan.

The reinsurance module 250 controls the reinsurance of the BOLI plan by the reinsurance company 118. The fronting company interface 270 gathers information from both the insurance company and reinsurance company to obtain policy values. The client reporting subsystem 290 verifies, reconciles, consolidates and reports the policy values for the bank 100. The administrative support subsystem 310 performs administrative procedures relating to the BOLI plan.

Figure 3:
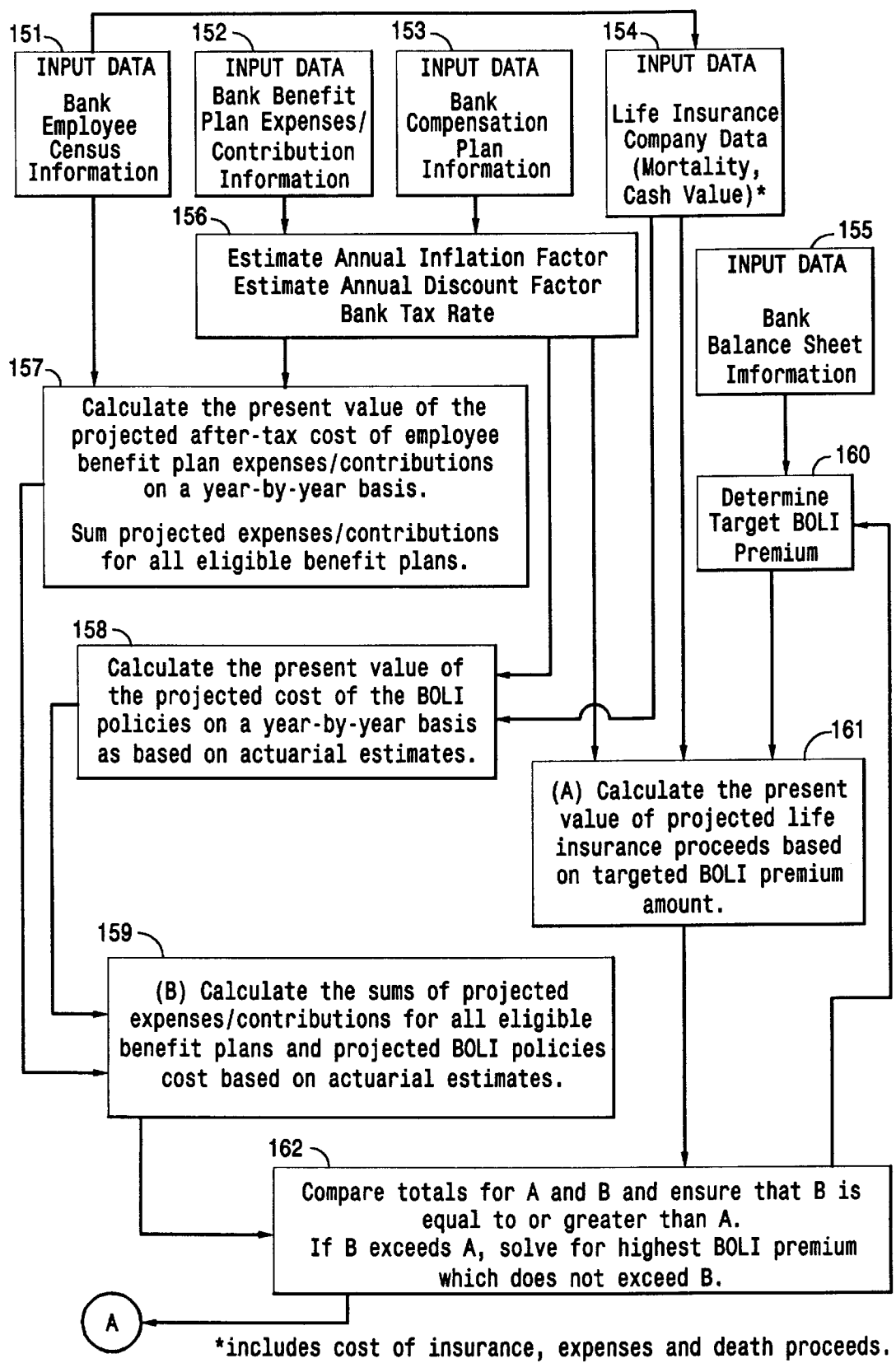
FIG. 3 is a block flow diagram of the analytical system for calculating BOLI plan limits per the Circular.

FIG. 3 is a block flow diagram of the analytical system for determining BOLI plan limits in accordance with the Circular. Under the Circular, a national bank may purchase life insurance only for a purpose incidental to the business of banking, and not as an investment. A life insurance policy is considered to be purchased and held for non-investment purposes if it satisfies either of two tests.

Test A applies if a bank purchases life insurance to indemnify itself against the death of an individual, i.e., key-person insurance. The amount of insurance coverage must closely approximate the risk of loss. The OCC considers the amount of insurance to be the total death benefit to be received upon the death of the insured. This includes the face amount of the policy, and premium to be returned, and accrued interest and/or dividends.

Under Test A, a bank can purchase life insurance to protect itself against the loss of key employees. Generally, a bank may purchase life insurance on the life of any officer or director of the bank whose death would be sufficiently significant to the bank as to create an insurable interest in his or her life.

The banks' board of directors is required to document the basis for determining which employees are key persons and the amount of insurance needed to indemnify the bank against the death of such persons. The bank may not purchase life insurance for an employee who cannot be demonstrated to be key to its business nor can the bank purchase an amount in excess of its potential loss.

The Circular also states that the bank's authority to hold life insurance on key employees terminates if the employee ceases to be a key person due to retirement, discharge, or some other event. Therefore, the economic effect of terminating or transferring life insurance policies must be evaluated carefully on an individual basis under Test A.

This provision of the Circular also allows a bank to purchase life insurance on the life of borrowers under certain circumstances and depending on applicable state law. Such policies must comply with the restrictions discussed above and may not be used by a bank as a method to recover obligations that have been or are expected to be written off.

Test B, which is used in a preferred embodiment of the present invention, applies when the bank purchases life insurance in conjunction with providing certain employee compensation or benefits, or when the insurance constitutes all or part of the benefit. Then, based upon reasonable actuarial benefit and financial assumptions, the present value of the projected cash flow from the policy must not substantially exceed the present value of the projected cost of the associated compensation or benefit program liabilities. The bank may include the insurance premiums paid and the associated time value of money in its calculation of the total cost of the liabilities.

Banks, including National banks, are afforded discretion in establishing compensation levels and benefit plans, though these banks are responsible to justify both. The Circular confirms that life insurance is a legally viable means for a bank to finance such obligations. Benefit plans discussed in the Circular include traditional employee benefits and direct fee deferral programs, but not estate management programs for key employees except as part of reasonable compensation. Life insurance purchased in connection with compensation agreements and benefit plans may be held for so long as the bank has a continuing liability under such agreements or plans. The OCC National Office staff confirms that calculations under Test B may be performed on an aggregate or group basis, that is, a particular policy need not be identified to finance a particular employee's benefit.

Thus, as shown in FIG. 3, employee census data 151, bank benefit plan expenses/contributions data 152, bank compensation plan information 153, life insurance company data such as mortality, cash value, cost of insurance, expenses and death proceeds 154, and bank balance sheet data 155, are inputted into the system. This information is derived from the HRIS interface 130 which interfaces with the HRIS system of the bank 100. Data 152 and data 153 are used to estimate the annual inflation factor, annual discount factor and bank tax rate 156 used by the circular limit module 150. Data 151 and data 156 are used to calculate the present value of the projected after tax cost of employee benefit plan expenses/contributions on a year-by-year basis and sum projected expenses and contributions for all eligible benefit plans 157. Data 154 and data 156 are used to calculate the present value of the projected cost of the BOLI policies on a year-by-year basis as based on actuarial estimates 158. The information generated by step 157 and 158 is used to calculate the sums of projected expenses and contributions for all eligible benefit plans and projected BOLI policies cost based on actuarial estimates 159.

Further shown in FIG. 3 is that bank balance sheet data 155 is used to determine target BOLI premium 160. To derive the target BOLI premium an asset and liability analysis is performed on the banks' balance sheet. The assets and liabilities analysis provides information to the assets and liability committee ("ALCO") of the bank.

Thus, the target BOLI premium 160 uses a software program ("ALCO program") which evaluates and compares the assets and liabilities of the bank to determine the advantages and disadvantages associated with the BOLI plan. The program also provides accounting characteristics of the BOLI plan and forecasts the performance of the plan.

The ALCO program uses the Monte Carlo method for its analysis. The program generates random scenarios and using those scenarios develops a probability curve showing the risk and rewards of the transaction. The bank's financial situation is compared to the probability curve in order to identify and eliminate as much risk from their assets and liability measurement as possible. In particular, the bank weighs various risk factors such as interest rate risks and credit risks and attempts to protect itself from interest rate swings or credit risk from the carrier. Thus, by using the probability curve and comparing the bank's financial situation to this curve to identify and minimize the risks associated with the transaction, a final premium amount for the BOLI plan is identified.

| State | Insurable Interest | Consent | State | Insurable Interest | Consent |
|---|---|---|---|---|---|
| Alabama | st | wr | Montana | st | wr |
| Alaska | st | wr | Nebraska | st | cr |
| Arizona | md | cr | Nevada | st | wr |
| Arkansas | md | wr | New Hampshire | cl | |
| California | md | wr | New Jersey | md | |
| Colorado | cl | | New Mexico | st | wr |
| Connecticut | cl | | New York | st | wr |
| Delaware | md | wr | North Carolina | md | |
| District of Col. | cl | | North Dakota | st | |
| Florida | cl | cr | Ohio | cl | |
| Georgia | md | pc | Oklahoma | me | wr |
| Hawaii | st | wr | Oregon | st | wr |
| Idaho | st | wr | Pennsylvania | st | no |
| Illinois | me | ng | Puerto Rico | cl | |
| Indiana | st | | Rhode Island | cl | |
| Iowa | cl | | South Carolina | cl | |
| Kansas | me | ng | South Dakota | st | wr |
| Kentucky | ** | ** | Tennessee | cl | |
| Louisiana | st | wr | Texas | st | wr |
| Maine | me | wr | Utah | st | wr |
| Maryland | me | wr | Vermont | cl | |
| Massachusetts | nr | wr | Virginia | me | nt |
| Michigan | me | cr | Washington | st | wr |
| Minnesota | md | wr | West Virginia | st | cr |
| Mississippi | cl | | Wisconsin | st | wr |
| Missouri | me | ng | Wyoming | st | wr |

Key
cl common law or case law statement of insurable interest
st statutory statement of insurable interest without explicit statement that an employer has such an interest
md statutory statement of insurable interest with statement that employer has such an interest in non-key employees
me statutory statement of insurable interest with statement that employer has such an interest and instruction as to measuring the value of the interest
nr insurable interest not required
cr consent required
wr written "positive" consent required
ng "negative" consent allowed
nt notice only required
no consent not required
pc public corporations with insurable interest may insure without consent; others require written consent
** Kentucky appears to be inhospitable to COLI since a corporation may only insure employees if the benefit is payable to a pension or benefit plan The goal of ALCO management is to match the bank's assets which would be invested in the BOLI plan against their liabilities which include the bank deposits. The bank wants to avoid the situation where the pricing of their deposits have a certain time duration associated with them. If those deposits shift or move away from the bank the bank must buy down their asset to balance this out. If the bank takes a wrong position on a product like BOLI, and fund it with short-term assets, they end up with disintermediation, which is the net outflow of capital from a bank or from a depository institution.

Thus, the bank is matching the probability of a 1% rise up or down in interest differentials and measuring the impact of that to the transaction. This is referred to as duration analysis, which is one of the analytical tools that banks use in their ALCO management. The program frames a transaction and the risk environment of the transaction given the deposit base of the bank or other liabilities for the banker.

A pro forma is then done for the bank based on this information. The pro forma states the profit potential for the BOLI plan. The bank uses the pro forma to decide whether it should engage in the BOLI transaction. If the bank can earn more with an alternative investment, that has comparable or reduced risk profile, it will forego purchasing the BOLI plan.

Once the target BOLI premium 160 is calculated, it is combined with data 156 and data 154 to calculate the present value of projected life insurance proceeds based on targeted BOLI premium amounts 161. The figure generated from present value costs 159 and present value proceeds 161 are compared. If present value proceeds 161 exceeds that of present value costs 159, the Circular limits generator 150 solves for the highest BOLI premium amount that does not exceed the present value costs 159.

Figure 4:
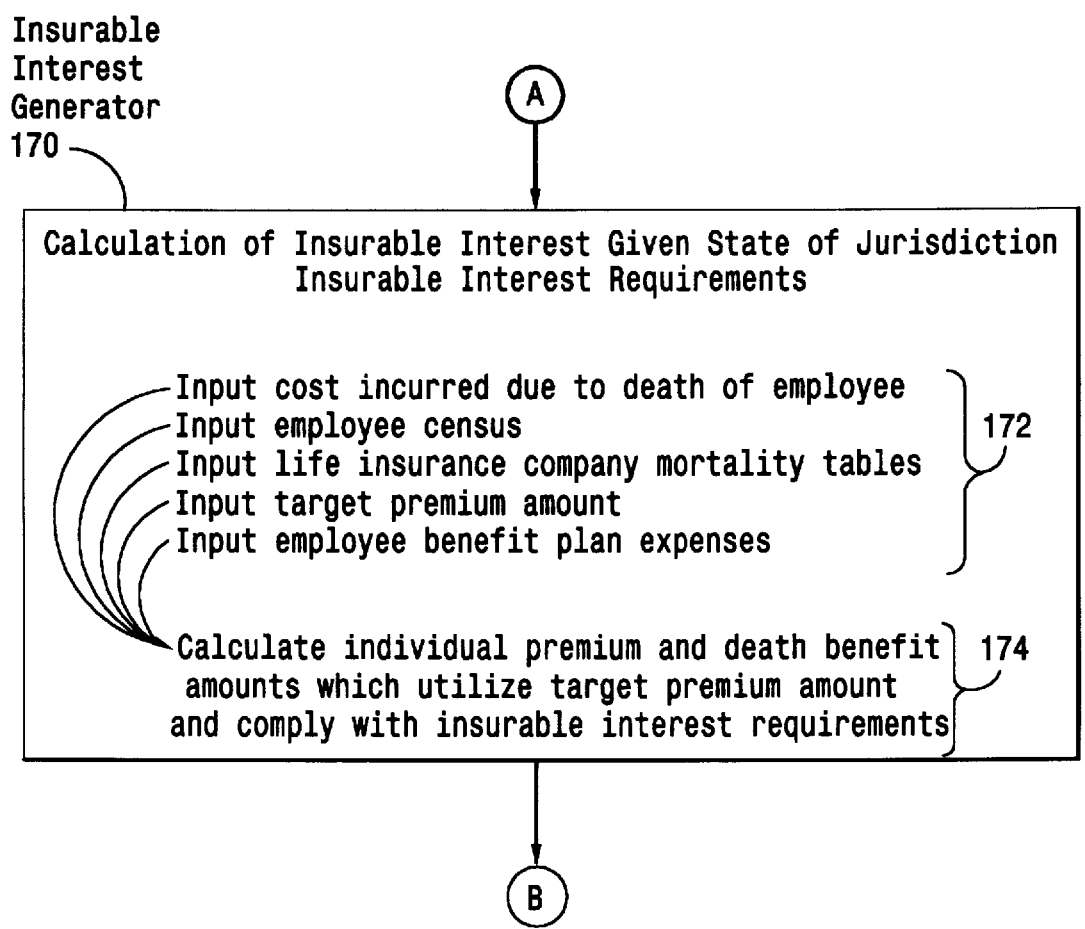
FIG. 4 is a block flow diagram of the analytical system for calculating a State's insurable interest.

FIG. 4 shows a block flow diagram for calculating a State's insurable interest. The insurable interest generator 170 calculates the insurable interest the bank 100 has in it employees as defined in the pertinent state statutes. Table 1 shows a listing of legal requirements for calculating insurable interest by state.

The purposes of the consent requirements and statutory requirements for insurable interest are to insure that a bank does not take out a death benefit policy on the life of an employee which exceeds the bank's loss. In general, a bank may take out a death benefit policy in the amount which is a multiple of 8–10 times the annual compensation of that employee. Annual compensation is the direct compensation which is taxable income to the employee in that year including any incentive awards.

The insurance carrier is responsible and punishable under state regulations for not complying with state insurable interest guidelines. Thus the bank is not directly responsible for not conforming with these guidelines. The bank, however, typically wants a warranty from the insurance carrier that they are purchasing a life insurance product as defined by the insurance statutes. For the insurance carrier to give such a warranty, the state insurable interest guidelines must be calculated and met.

Thus, the information needed to calculate insurable interest 172 are inputted into the system, including cost incurred due to the death of an employee, employee census data, life insurance company mortality tables, target premium amount, and employee benefit plan expenses. The insurable interest generator calculates individual premium and death benefit amounts using the target premium amount and insurable interest requirements.

Figure 5:
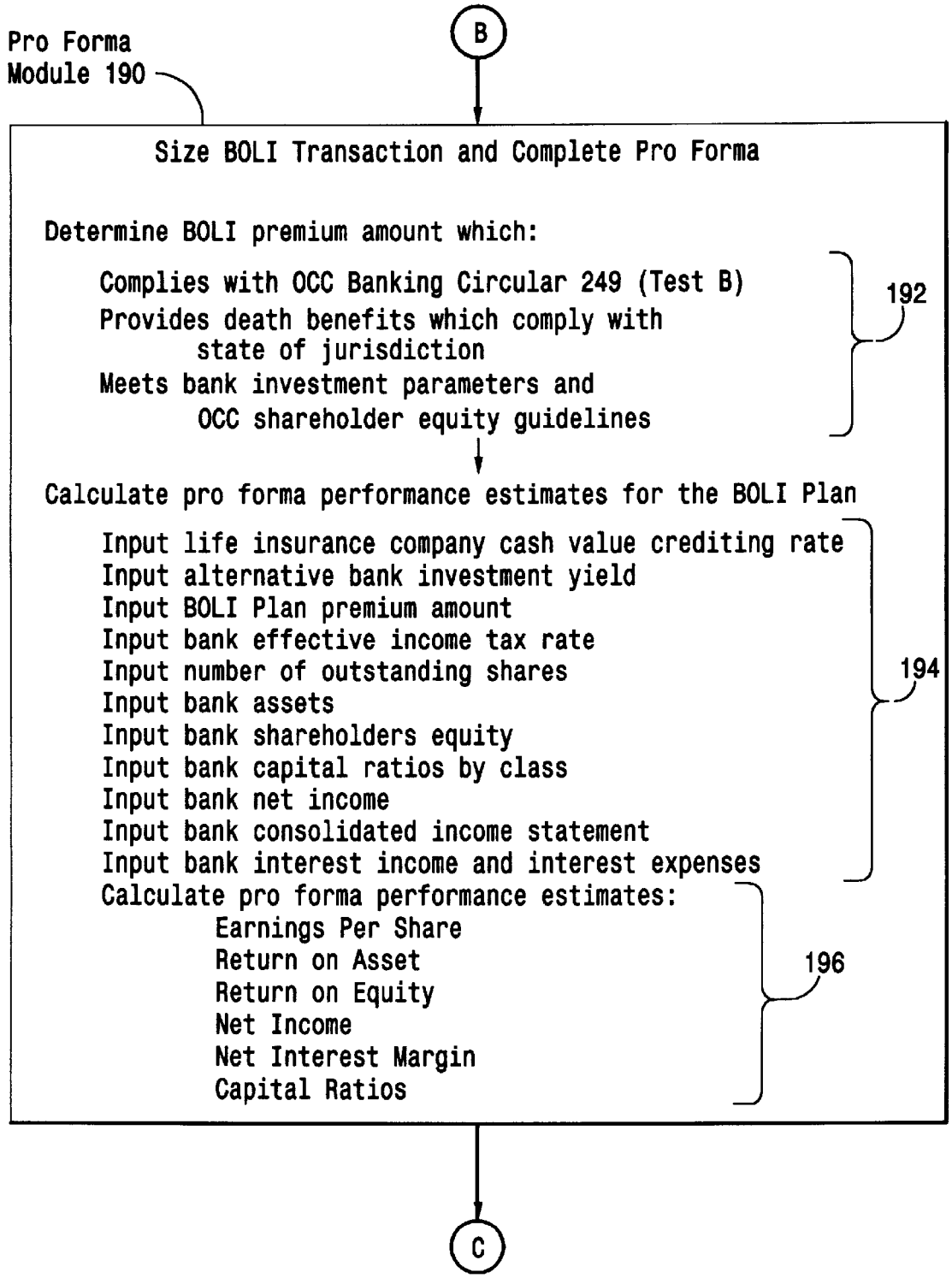
FIG. 5 is a block flow diagram of the analytical system for sizing the BOLI transaction and generating performance estimates for the BOLI plan.

FIG. 5 is a block flow diagram of the analytical system for sizing the BOLI transaction and generating performance estimates for the BOLI plan. Once the system calculates the BOLI premium amount which is in compliance with the Circular, determines death benefits according to the pertinent state statute, and meets bank investment parameters and OCC shareholder equity guidelines 192, the pro forma module 190 calculates performance estimates for the BOLI plan. These estimates are derived from financial information 194 inputted into the system, and translated into the pro forma categories 196.

One such pro forma category is Capital Ratios. In addition to the Circular, national banks are also required by the OCC to comply with so-called risk-based capital (or "RBC") requirements. Under these requirements, a bank must maintain at least a minimum amount of capital which varies depending upon, among other things, the perceived quality of its assets. In applying these requirements, a life insurance policy held as an asset is treated as having a "100 percent risk-weight," meaning that capital is required for 100 percent of the life insurance policy's cash surrender value. In contrast, the Treasury bills or other assets that a purchasing bank will have sold to buy BOLI may have a lower risk-weight (e.g., Treasury bills have a zero-percent risk weight), meaning that less (or no) capital was required with respect to these assets. Thus, by converting its assets into BOLI policies, a purchasing bank's minimum capital requirements could increase. In a marginal case, the acquisition of BOLI could require the bank either to attract more equity or to restrict the loans that it makes. A purchasing bank therefore must use capital, not borrowed money, to purchase BOLI in order to preserve its pre-purchase capital ratio and help meet its RBC requirements.

Figure 6:
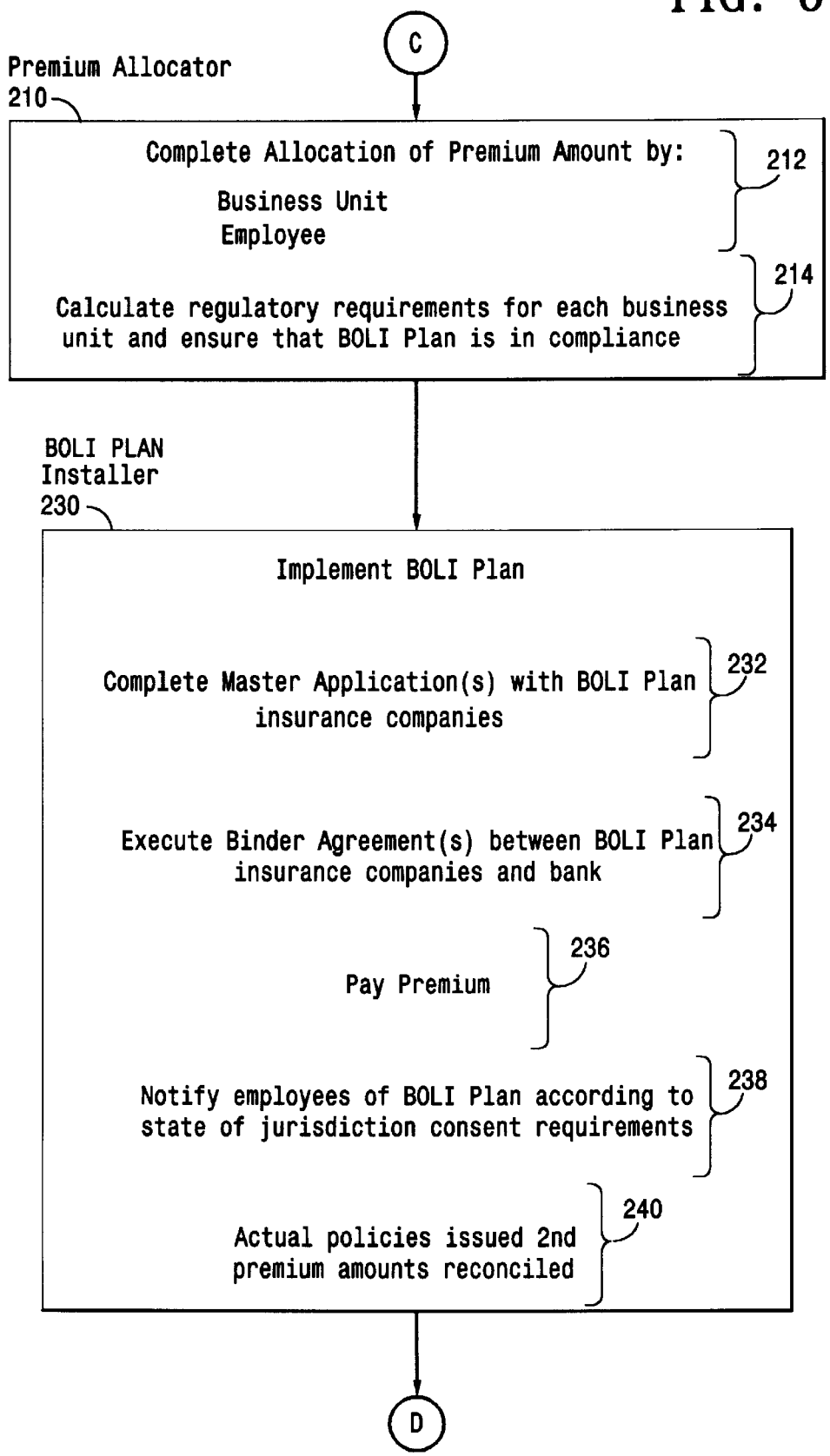
FIG. 6 is a block flow diagram of the analytical system for completing allocation of the BOLI plan premium amount by business unit and employee; and a block flow diagram of the analytical system for implementing the BOLI plan.

FIG. 6 shows a block flow diagram of the analytical system for completing allocation of the BOLI plan premium amount by business unit and employee 212. The premium allocatur 210 calculates regulatory requirements for each business unit and ensures the BOLI plan is in compliance 214.

FIG. 6 also shows a block flow diagram of the analytical system for implementing the BOLI plan. Although steps 232, 234, 236, and 238 are currently not part of the computer-based system, but rather are procedures which are initiated through information derived from the BOLI system, it is apparent that such steps can be implemented in computer form in future embodiments of the present invention. For example, it is envisioned that binder agreements between BOLI plan insurance companies and a bank could be handled in a paperless fashion utilizing computerized forms and signatures. Instead of executing agreements by written signature, electronic signatures could be affixed to electronic documents at the press of a keystroke, with hard copies distributed as a verification step. Similarly, master applications could be completed in an identical manner with the signatures of a bank officer being in electronic rather than handwritten form. Employee notification could be automated, and premium payments are already handled by wire transfers for the most part and could be simply and efficiently administered by the BOLI system as well. The computer-based BOLI system ensures that actual policies issued and premium amounts are reconciled 240.

FIG. 7 shows a block flow diagram of the analytical computer system for reinsuring the BOLI plan. Reinsuring the BOLI plan by a captive insurance subsidiary of the parent bank or holding company allows the bank to augment the cash value gains of the BOLI plan by providing cash revenue sources from fee income associated with investment and trust management. Reinsurance also minimizes the impact to the bank's profit and loss statement by keeping the assets within the corporate structure of the bank holding company. Furthermore, since a large portion of the premium assets remain within the reinsurance company, the premium assets left in the insurance company are minimized with respect to complying with the 15% institutional lending limit.

The preferred embodiment of the reinsurance module uses the share quota approach to reinsurance. The share quota approach and the relationship between the insurance company 106 and the reinsurance company 118 are defined by the reinsurance treaty 112. The reinsurance treaty 112 sets forth in detail the percentage of premiums the insurance company is to pay to the reinsurance company, and the risk sharing relationship and responsibilities of each party.

For example, the bank 100 purchases a BOLI plan with a hundred million dollar premium amount and one thousand policies. The reinsurance company will take a certain portion of the premium dollar amount in return for assuming the risk, liability, and investment performance requirements associated with that premium dollar amount. The reinsurance company could choose to acquire a fifty percent interest in all thousand policies or a one hundred percent interest in the first five hundred policies. The exact details will be defined in the reinsurance treaty.

The BOLI system administers and supports the steps required to implement the reinsurance plan. As shown in FIG. 7, the first step 252 in reinsuring the BOLI plan is to prepare and execute the reinsurance treaty. The second step 254 is to evaluate statutory restrictions of reinsurance policies and risk assumptions and ensure compliance. Both these steps are currently performed by hand, but could easily be converted into a component of the computer-based BOLI system.

The third step 256 is to model the reinsurance company's financials to measure impact on surplus and to test life company tax status. These steps are performed by the computer-based BOLI system.

To measure impact on surplus the financial statements of the acquiring reinsurer are examined to determine if it can support the risk. One aspect of this risk is determined by using certain financial assumptions. Take our example of one hundred million dollars of premium amount, and a fifty-fifty reinsurance relationship where the insurance company retains fifty-percent of the policies, or in other words, the reinsurance company is going to reinsure fifty million dollars of the premium amount. Assuming four dollars worth of death benefit for every dollar of premium, the mortality risk assumed by the reinsurance company is two hundred million dollars for this transaction. The financial position of the reinsurance company is modeled to determine the impact on surplus since this transaction causes a surplus drain. To prepare for this drain on surplus, a determination is made as to whether the reinsurance company has the necessary reserves or surplus to cover the potential mortality risk, or whether the bank or holding company (i.e., parent company) is going to transfer the necessary capital to the reinsurance company (i.e., captive insurance provider).

The second reason the reinsurance company's financials are examined is to ensure life company status. The reason for this is for tax purposes. Insurance companies are taxed differently depending on their status as a property and casualty company or life company. The reserves of life companies are not taxed. To have life company status the company must have fifty-percent of the company's premiums and reserves in the form of life insurance.

Thus, in our example of fifty million dollars worth of reinsurance, the inflow of fifty million dollars is going to dramatically affect even the largest reinsurer's balance sheet. This inflow of capital potentially impacts the life company status of the reinsurer, and must be evaluated.

The fourth step 258 is to prepare and execute the custodial trust agreement 114 and/or letter of credit between the insurance company, reinsurance company and trust company. The custodial trust agreement and/or letter of credit 114 is necessary since the reinsurance company is a captive subsidiary of the parent bank or holding company. Thus, to ensure an arms length relationship between the bank and the reinsurance company, the assets must be placed in a trust so that it is not commingled with any assets of the bank or other subsidiary of the holding company. This prevents the situation where the bank fails thus relieving the reinsurance company from its obligations and yet allowing the bank to demand full payment from the insurance company.

In addition to governing the trusteed assets, the custodial trust agreement 114 defines the relationship under which additional funds can be added or subtracted from the reinsurance arrangement. It also defines the minimum amounts that need to be on deposit at any point in time. The insurance company will want assurances that the reinsurance company has enough unencumbered reserves to meet the minimum requirements for the transaction.

Step five 260 involves ceding the business from the insurance company to the reinsurance company. "Ceding" is the technical term for actually moving the risk, assets and liabilities off the insurance company to the reinsurance company. This is executed through an automated reserve letter and ceding statement which contains calculation of ceding fees, premiums, claims, taxes, commissions and cash flow, risks and reserves assumed, and the "in force" calculations and descriptions of the mortality risk associated with the transaction. Inforce is a schedule which defines what risk the reinsurance company is assuming. In our previous example, if we use the share quota approach and will assume the premiums and risk for fifty-percent of the one hundred million dollar BOLI plan with one thousand policies, the inforce schedule will contain information on whether the reinsurance company will take fifty-percent of the one thousand policies or one-hundred percent of five hundred policies.

Step number six 262 requires the premiums received by the reinsurance company to be automatically invested according to Investment Committee Guidelines, which form a codicil of the custodial trust agreement. These guidelines are governed by federal and state insurance regulations, which are generally broader than those governing banks, and agreements made between the insurance and reinsurance company.

The seventh step 264 is performed by the computer-based BOLI system. On a monthly basis, investment income is calculated and charged against the expenses to determine the profit and loss on the transaction. Similarly, on a monthly basis step eight 266 is calculated to ensure that the stipulated minimum cash value of the BOLI plan that the bank originally purchased is on deposit. The Trustee will examine the reserves monthly and determine the amount of reserves needed to cover the amount of investment performance stipulated by the BOLI plan. If deficient, the difference will be made up from investment income or from additional paid-in capital from the reinsurance company.

In our example of a one hundred million dollar BOLI plan with fifty-percent being reinsured and a five percent growth in cash value per year, the cash value of the policies should amount to one hundred and five million at the end of year one. The reinsurance company must ensure that fifty-two million five hundred thousand dollars is in the reserves to cover the cash surrender value of the policies should they be surrendered. This is detailed in the reinsurance treaty.

Step nine 268 is accomplished by the computer-based BOLI system. The BOLI system records the BOLI plan reinsurance profit or loss by the reinsurance company. The determination of profit or loss depends on whether the generally accepted accounting principles (GAAP) or statutory accounting principles (STAT) are used.

Figure 8:
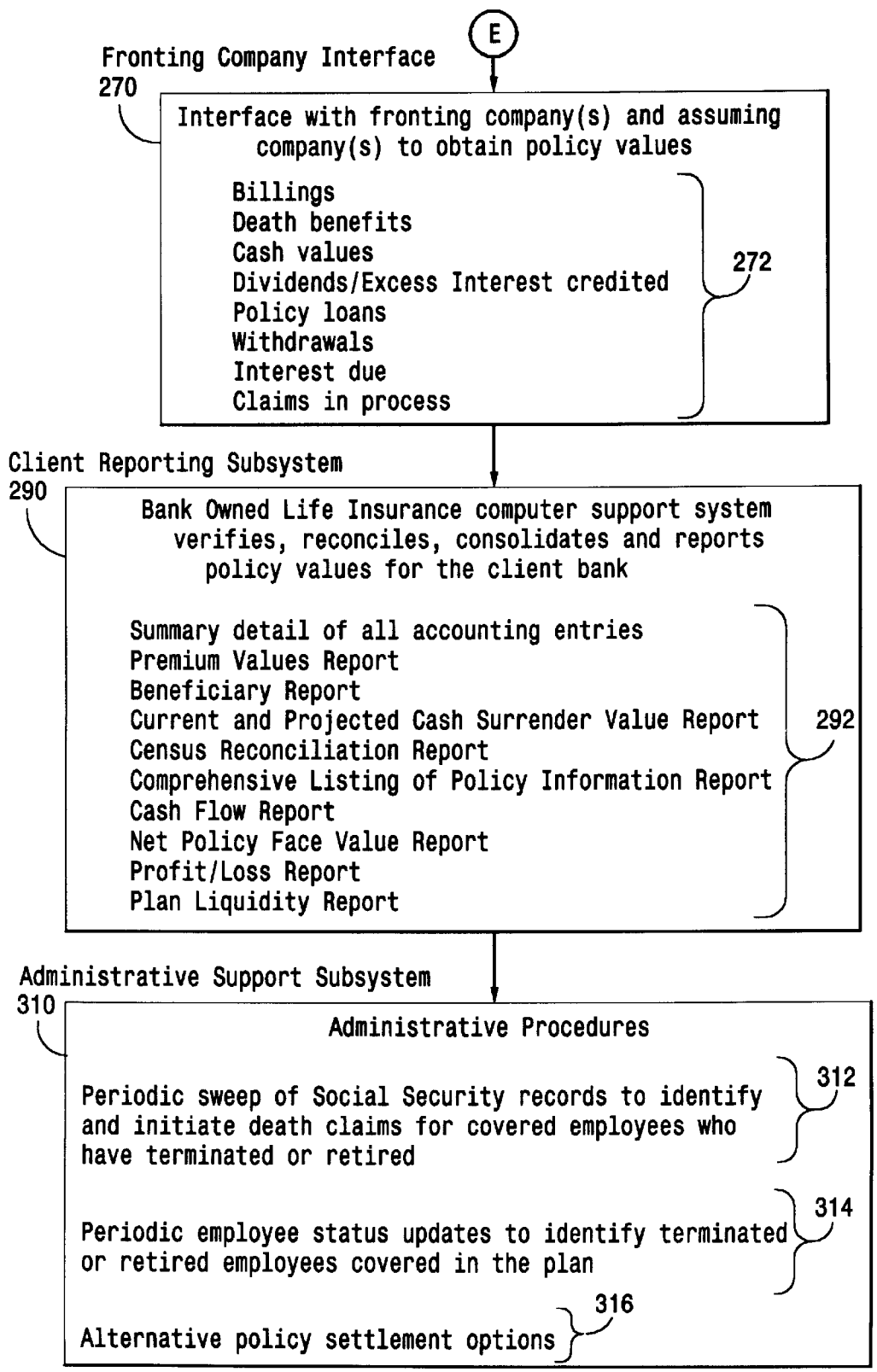
FIG. 8 is a block flow diagram for obtaining policy values and a listing of information required to obtain such policy values; a block flow diagram showing the reports generated by the system; and a block flow diagram showing the administrative procedures performed by the present invention.

FIG. 8 shows a block flow diagram for obtaining policy values and a listing of information required to obtain such policy values, showing the reports generated by the system and the administrative procedures performed by the present invention. The fronting company interface 270 takes insurance information such as billings, death benefits, cash values, dividends/excess interest credited, policy loans if any, withdrawals if any, interest due, claims in process for each of the accounts 272 from the insurance company and reinsurance company. The client reporting subsystem 290 takes this information and prepares reports 292 for the bank 100 showing the value of the transaction.

The administrative support subsystem 310 performs periodic sweeps of social security records to identify death claims for covered employees who have terminated or retired 312. Periodic employee status updates are also done to identify terminated or retired employees covered in the plan 314. This information is used as a basis for determining whether a policy has endowed. Endowment means that the life of the insured matches that defined by the policy. Thus, if the life insurance policy is a life to 95 policy, and if the insured lives to age 95, the policy is endowed.

At this point, alternative settlement options are evaluated 316. Typically, the cash value of the policy is left deposited with the insurance carrier, and the bank pays taxable interest on the gain from that point on since it technically no longer constitutes life insurance. Once the insured passes away, the bank receives the death benefits tax free. If the policy is surrendered before the insured passes away, all the accrued interest over the policy basis is treated as taxable gain. Thus, depending on the bank's need for capital at the particular moment of endowment drives the selection of the appropriate settlement option.

Although a preferred embodiment is specifically illustrated and described herein, it will be appreciated that modifications and variations of the present invention are covered by the above teachings and within the purview of the appended claims without departing from the spirit and intended scope of this invention.

What is claimed is:

1. A system for designing and administering a bank owned life insurance plan for a financial organization, comprising:
   a. means for determining the highest bank owned life insurance premium permitted under Office of the Comptroller of the Currency banking guidelines
   b. means for determining insurable interest requirements by accessing a database with the appropriate state's insurable interest guidelines;
   c. means for generating performance estimates for said bank owned life insurance plan, wherein said performance estimates are used to ensure compliance with risk-based capital requirements;
   d. means for allocating premium amount by business unit and employee, and for calculating regulatory requirements for said business unit and employee, and for ensuring that said bank owned life insurance plan is in compliance with the regulatory requirements for said business unit;
   e. means for calculating maximum risks and premium values that can be reinsured through a captive insurance company of said financial organization;
   f. means for said captive insurance company to obtain policy values;
   g. means for verifying, reconciling, consolidating and reporting policy values for said financial organization; and
   h. means for performing administrative procedures for said bank owned life insurance plan of said financial organization.

2. A method for designing and administering a bank owned life insurance plan for a financial organization, the method comprising the steps of:
   a. determining in at least one computer a bank owned life insurance premium;
   b. determining insurable interest requirements;
   c. generating performance estimates for said bank owned life insurance plan, wherein said performance estimates are used to ensure compliance with risk-based capital requirements;
   d. allocating premium amount by business unit and employee;
   e. calculating regulatory requirements for said business unit and employee;
   f. storing said premium amount in a memory of said at least one computer;
   g. ensuring that said bank owned life insurance plan is in compliance with the regulatory requirements for said business unit;
   h. verifying, reconciling, consolidating in said computer and reporting from said at least one computer policy values for said financial organization; and
   i. performing administrative procedures for said bank owned life insurance plan of said financial organization.

3. The method according to claim 2, wherein said bank owned life insurance premium is a highest bank owned life insurance premium permitted under Office of the Comptroller of the Currency banking guidelines.

4. The method according to claim 2, wherein said insurable interest requirements are selected from a database of different state's insurable interest requirements.

5. The method according to claim 2, further comprising the step of reinsuring said bank owned life insurance plan.

6. The method according to claim 5, wherein the step of reinsuring said bank owned life insurance plan is performed through a captive insurance company of said financial organization.

7. An apparatus for designing and administering a bank owned life insurance plan for a financial organization, comprising:
   a. a first inputting means for inputting employee data;
   b. a second inputting means for inputting information from an insurance company;
   c. a reporting means; and
   d. a processor, said processor connected to said first and second inputting means and said reporting means, wherein said processor accepts employee data from said first inputting means, determines a bank owned life insurance premium and insurable interest requirements, generates performance estimates for said bank owned life insurance plan, allocates premium amount by business unit and employee, calculates regulatory requirements for said business unit and employee, ensures that said bank owned life insurance plan is in compliance with the regulatory requirements for said business unit, accepts policy values from said second inputting means, sends the policy values to said reporting means, wherein said reporting means verifies, reconciles, consolidates and reports the policy values, and said processor performs administrative procedures for said bank owned life insurance plan of said financial organization.

8. The apparatus according to claim 7, wherein said bank owned life insurance premium calculated by said processor is a highest bank owned life insurance premium permitted under Office of the Comptroller of the Currency banking guidelines.

9. The apparatus according to claim 7, wherein said insurable interest requirements are selected from a database of different state's insurable interest requirements.

10. The apparatus according to claim 7, wherein said second inputting means further inputs reinsurance information from a reinsurance company, and said processor uses said reinsurance information to reinsure said bank owned life insurance plan.

11. The apparatus according to claim 7, wherein said performance estimates are used to ensure compliance with risk-based capital requirements.

* * * * *